(12) United States Patent
Miyasaka

(10) Patent No.: US 9,584,695 B2
(45) Date of Patent: Feb. 28, 2017

(54) INFORMATION PROCESSING APPARATUS AND INFORMATION PROCESSING SYSTEM

(71) Applicant: Daiya Miyasaka, Chiba (JP)

(72) Inventor: Daiya Miyasaka, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/536,765

(22) Filed: Nov. 10, 2014

(65) Prior Publication Data

US 2015/0131130 A1    May 14, 2015

(30) Foreign Application Priority Data

Nov. 12, 2013  (JP) ................................ 2013-234031

(51) Int. Cl.
   *G06F 3/12* (2006.01)
   *H04N 1/00* (2006.01)
   *H04N 1/21* (2006.01)
   *H04N 1/32* (2006.01)

(52) U.S. Cl.
   CPC ....... *H04N 1/2179* (2013.01); *H04N 1/00244* (2013.01); *H04N 1/324* (2013.01); *H04N 1/32133* (2013.01)

(58) Field of Classification Search
   None
   See application file for complete search history.

(56) References Cited

U.S. PATENT DOCUMENTS

| | | | | |
|---|---|---|---|---|
| 6,021,433 A * | 2/2000 | Payne et al. | | 709/219 |
| 6,192,407 B1 * | 2/2001 | Smith et al. | | 709/229 |
| 6,343,318 B1 * | 1/2002 | Hawkins | | G06F 17/3089 707/E17.116 |
| 6,609,128 B1 * | 8/2003 | Underwood | | G06F 9/4448 707/610 |
| 6,633,878 B1 * | 10/2003 | Underwood | | G06Q 10/10 |
| 6,718,535 B1 * | 4/2004 | Underwood | | G06F 9/4443 717/101 |
| 6,839,741 B1 * | 1/2005 | Tsai | | 709/217 |
| 6,961,712 B1 * | 11/2005 | Perkowski | | 705/26.62 |
| 7,016,062 B2 * | 3/2006 | Ishizuka | | G06Q 30/0613 358/1.15 |

(Continued)

FOREIGN PATENT DOCUMENTS

| | | |
|---|---|---|
| JP | 2006-003999 | 1/2006 |
| JP | 2006-343874 | 12/2006 |
| JP | 2013-020326 | 1/2013 |

*Primary Examiner* — Madelein Nguyen
(74) *Attorney, Agent, or Firm* — IPUSA, PLLC

(57) ABSTRACT

An information processing apparatus is provided for generating delivery data to be delivered to a delivery destination in response to an input of processing data. The information processing apparatus includes an acquisition unit configured to acquire other data from a reference destination specified by specific information included in the processing data in a case where the specific information specifying the reference destination of the other data is extracted from the content of the processing data, and a generation unit configured to generate the delivery data in response to an input of the processing data, the delivery data being configured such that the other data acquired by the acquisition unit is viewable based on the delivery data.

18 Claims, 13 Drawing Sheets

(56) References Cited

U.S. PATENT DOCUMENTS

| | | | |
|---|---|---|---|
| 7,079,291 B2* | 7/2006 | Ichikawa | H04N 1/00209 358/1.1 |
| 7,224,491 B2* | 5/2007 | Shinchi | H04L 12/58 358/1.15 |
| 7,242,493 B2* | 7/2007 | Hall et al. | 358/1.15 |
| 7,266,557 B2* | 9/2007 | Aschen et al. | |
| 7,408,661 B2* | 8/2008 | Hoshino | G06F 3/1222 358/1.15 |
| 7,650,010 B2* | 1/2010 | Levy et al. | 382/100 |
| 7,978,353 B2* | 7/2011 | Kasatani | G06F 21/604 358/1.13 |
| 8,082,323 B2* | 12/2011 | Yamaguchi | G06F 21/31 358/1.15 |
| 8,154,740 B2* | 4/2012 | Okada | G03G 15/5066 358/1.13 |
| 8,531,697 B2* | 9/2013 | Arita | G06Q 10/06 358/1.1 |
| 8,879,077 B2* | 11/2014 | Tamura | H04N 1/00217 358/1.13 |
| 9,007,604 B2* | 4/2015 | Toscano | H04N 1/00206 358/1.13 |
| 2002/0016818 A1* | 2/2002 | Kirani et al. | 709/203 |
| 2002/0052922 A1* | 5/2002 | Matsuura | H04L 12/5835 709/206 |
| 2002/0109706 A1* | 8/2002 | Lincke | G06F 17/3089 715/700 |
| 2002/0116263 A1* | 8/2002 | Gouge | 705/14 |
| 2002/0194380 A1* | 12/2002 | Sullivan et al. | 709/246 |
| 2003/0028647 A1* | 2/2003 | Grosu | 709/227 |
| 2003/0046363 A1* | 3/2003 | Ezato | 709/218 |
| 2003/0065805 A1* | 4/2003 | Barnes, Jr. | 709/231 |
| 2003/0120729 A1* | 6/2003 | Kim et al. | 709/203 |
| 2003/0137693 A1* | 7/2003 | Nishio | H04L 67/16 358/1.15 |
| 2003/0139975 A1* | 7/2003 | Perkowski | 705/26 |
| 2003/0169730 A1* | 9/2003 | Narasimhan et al. | 370/355 |
| 2004/0036907 A1* | 2/2004 | Simpson | H04N 1/00204 358/1.15 |
| 2004/0143650 A1* | 7/2004 | Wollowitz | 709/219 |
| 2004/0267638 A1* | 12/2004 | Giunta | 705/27 |
| 2005/0013462 A1* | 1/2005 | Rhoads | 382/100 |
| 2005/0094178 A1* | 5/2005 | Anno | H04N 1/00244 358/1.13 |
| 2005/0105129 A1* | 5/2005 | Takahashi | H04N 1/00204 358/1.15 |
| 2005/0114766 A1* | 5/2005 | Yamamoto | G06F 17/30905 715/277 |
| 2005/0216421 A1* | 9/2005 | Barry | G06F 11/0709 705/64 |
| 2006/0059462 A1* | 3/2006 | Yamamoto | G06F 17/2247 717/115 |
| 2006/0218234 A1* | 9/2006 | Deng et al. | 709/206 |
| 2006/0279780 A1* | 12/2006 | Anno | G06F 3/1204 358/1.15 |
| 2007/0143398 A1* | 6/2007 | Graham | 709/204 |
| 2007/0206216 A1* | 9/2007 | Sakagami | G06F 21/34 358/1.15 |
| 2007/0236732 A1* | 10/2007 | Henry | H04N 1/00212 358/1.15 |
| 2008/0130040 A1* | 6/2008 | Henry | H04N 1/32112 358/1.15 |
| 2008/0231887 A1* | 9/2008 | Sakagami | H04N 1/00204 358/1.15 |
| 2009/0290193 A1* | 11/2009 | Ohba | G06F 21/10 358/1.15 |
| 2010/0245908 A1* | 9/2010 | Tonegawa | G03G 15/502 358/1.15 |
| 2011/0208822 A1* | 8/2011 | Rathod | 709/206 |
| 2011/0228328 A1* | 9/2011 | Sugimoto | G06F 9/542 358/1.15 |
| 2011/0246571 A1* | 10/2011 | Klier et al. | 709/203 |
| 2011/0286039 A1* | 11/2011 | Akimoto | H04N 1/00204 358/1.15 |
| 2011/0317211 A1* | 12/2011 | Yamada | G06F 9/50 358/1.15 |
| 2012/0240243 A1* | 9/2012 | Allardyce | G06F 21/6218 726/28 |
| 2013/0013662 A1 | 1/2013 | Masuda | |
| 2013/0081146 A1* | 3/2013 | Hakozaki | H04N 1/00222 726/28 |
| 2013/0095864 A1* | 4/2013 | Marovets | 455/466 |
| 2014/0022591 A1* | 1/2014 | Asahara | G06F 3/1236 358/1.15 |
| 2014/0362404 A1* | 12/2014 | Miyasaka | 358/1.15 |
| 2015/0370847 A1* | 12/2015 | Kondoh | G06Q 10/06 707/691 |
| 2016/0006889 A1* | 1/2016 | Kanno | H04N 1/00225 358/1.15 |

* cited by examiner

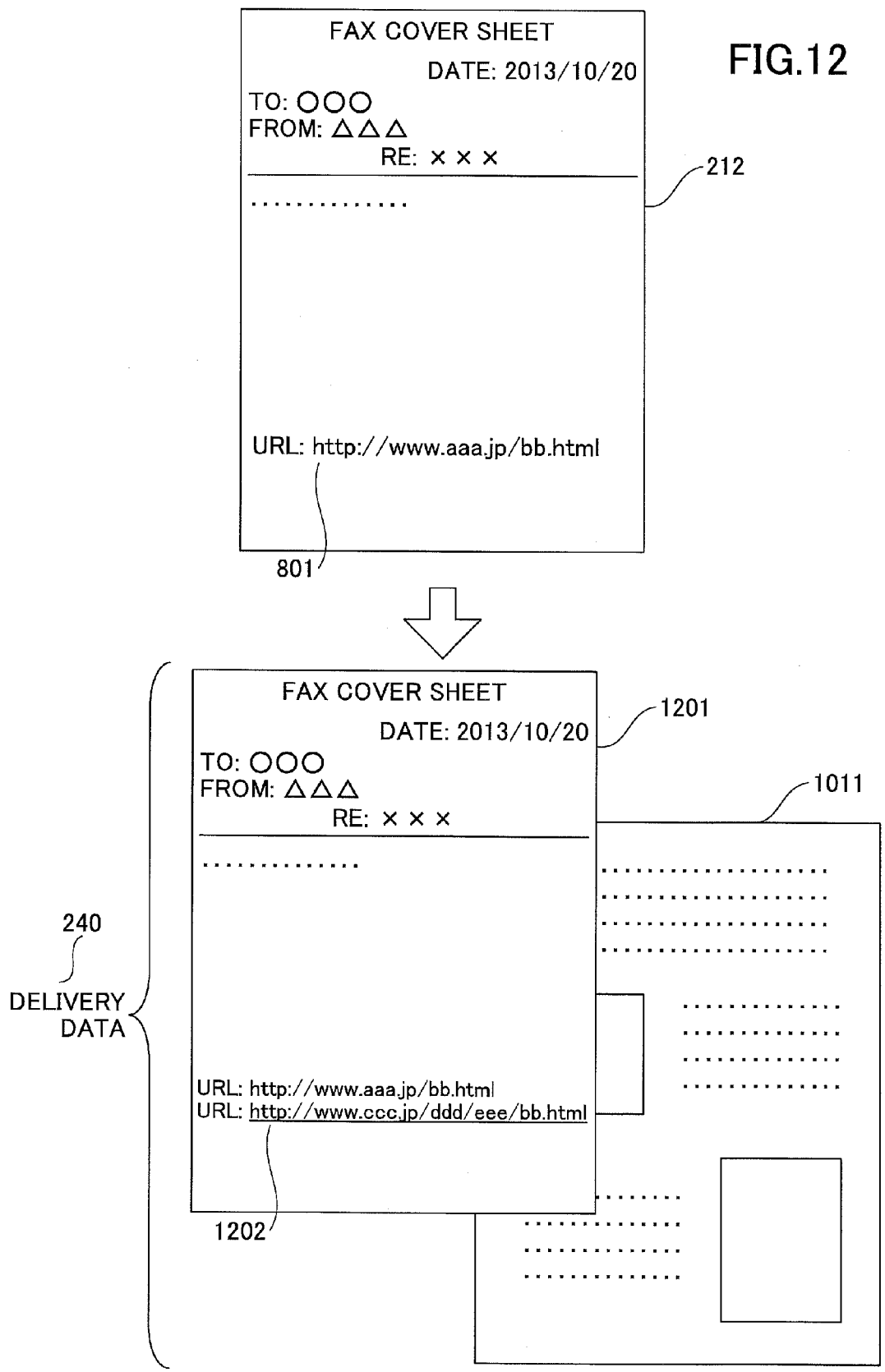

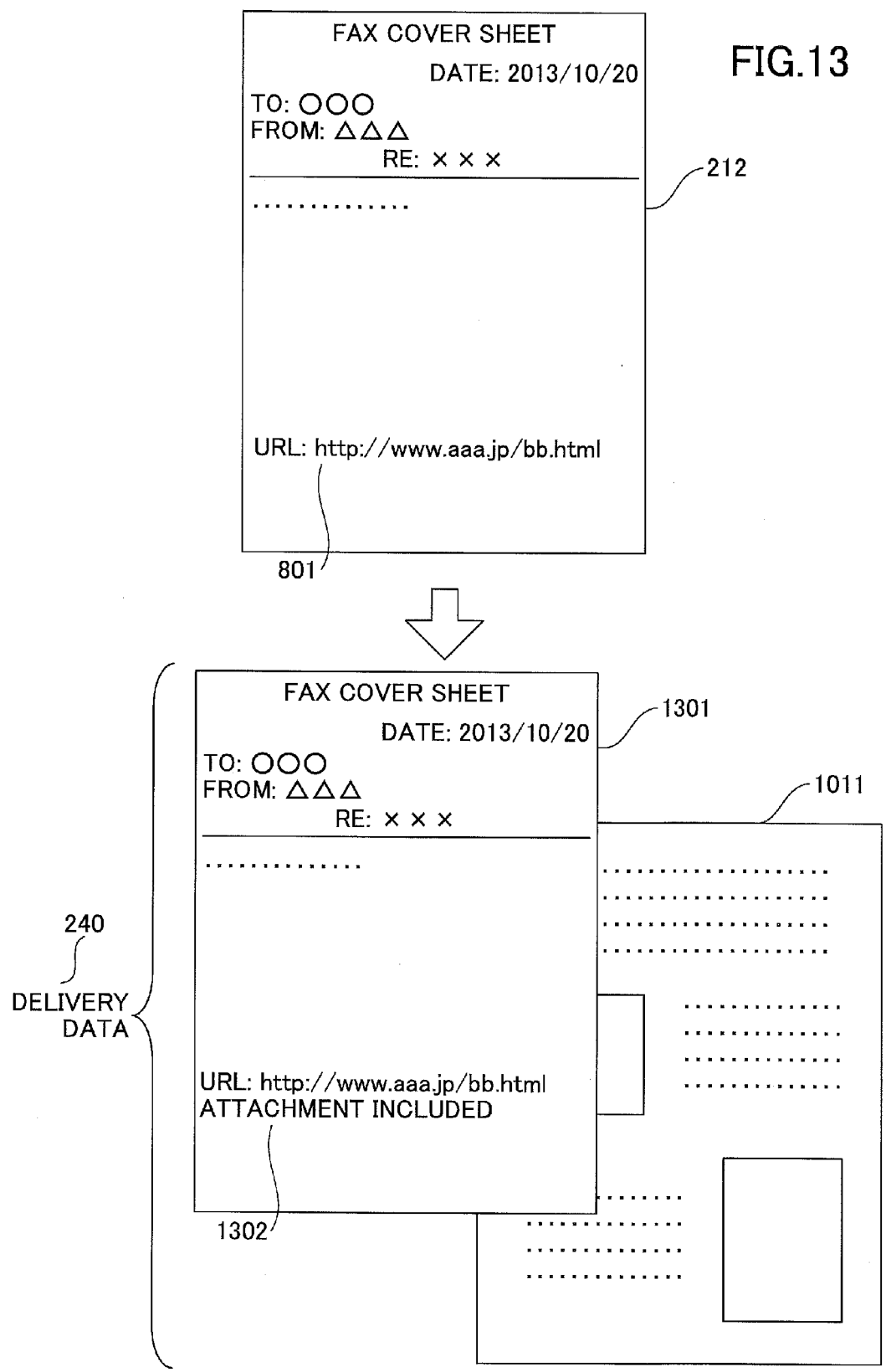

INFORMATION PROCESSING APPARATUS AND INFORMATION PROCESSING SYSTEM

BACKGROUND OF THE INVENTION

1. Field of the Invention

The present invention relates to an information processing apparatus and an information processing system.

2. Description of the Related Art

Document delivery systems that use an information processing apparatus such as a document delivery server to deliver document data are known (see e.g. Japanese Laid-Open Patent Publication No. 2013-020326). In such document delivery systems, document data that is input by scanning an original document with an image forming apparatus such as a scanner may be delivered to a desired delivery destination that is designated by a user, for example.

In a growing number of cases, document data to be delivered includes one or more links (references to other resources including document data, image data, and other types of data). In such cases, a user at a delivery destination of the document data may view the linked data by accessing the link destination.

However, in general, linked data can often be deleted or changed. Thus, by the time the user at the delivery destination accesses the link destination, the desired data may already be unavailable.

In view of the above, an information processing apparatus such as a document delivery server that delivers document data is preferably configured to implement a mechanism for ensuring the availability of linked data in order to improve usability for the user at the delivery destination.

SUMMARY OF THE INVENTION

According to one embodiment of the present invention, an information processing apparatus is provided for generating delivery data to be delivered to a delivery destination in response to an input of processing data. The information processing apparatus includes an acquisition unit configured to acquire other data from a reference destination specified by specific information included in the processing data in a case where the specific information specifying the reference destination of the other data is extracted from the content of the processing data, and a generation unit configured to generate the delivery data in response to an input of the processing data, the delivery data being configured such that the other data acquired by the acquisition unit is viewable based on the delivery data.

BRIEF DESCRIPTION OF THE DRAWINGS

FIG. 12 illustrates another exemplary manner in which the document delivery server generates delivery data; and FIG. 13 illustrates another exemplary manner in which the document delivery server generates delivery data.

DESCRIPTION OF THE PREFERRED EMBODIMENTS

Figure 1:
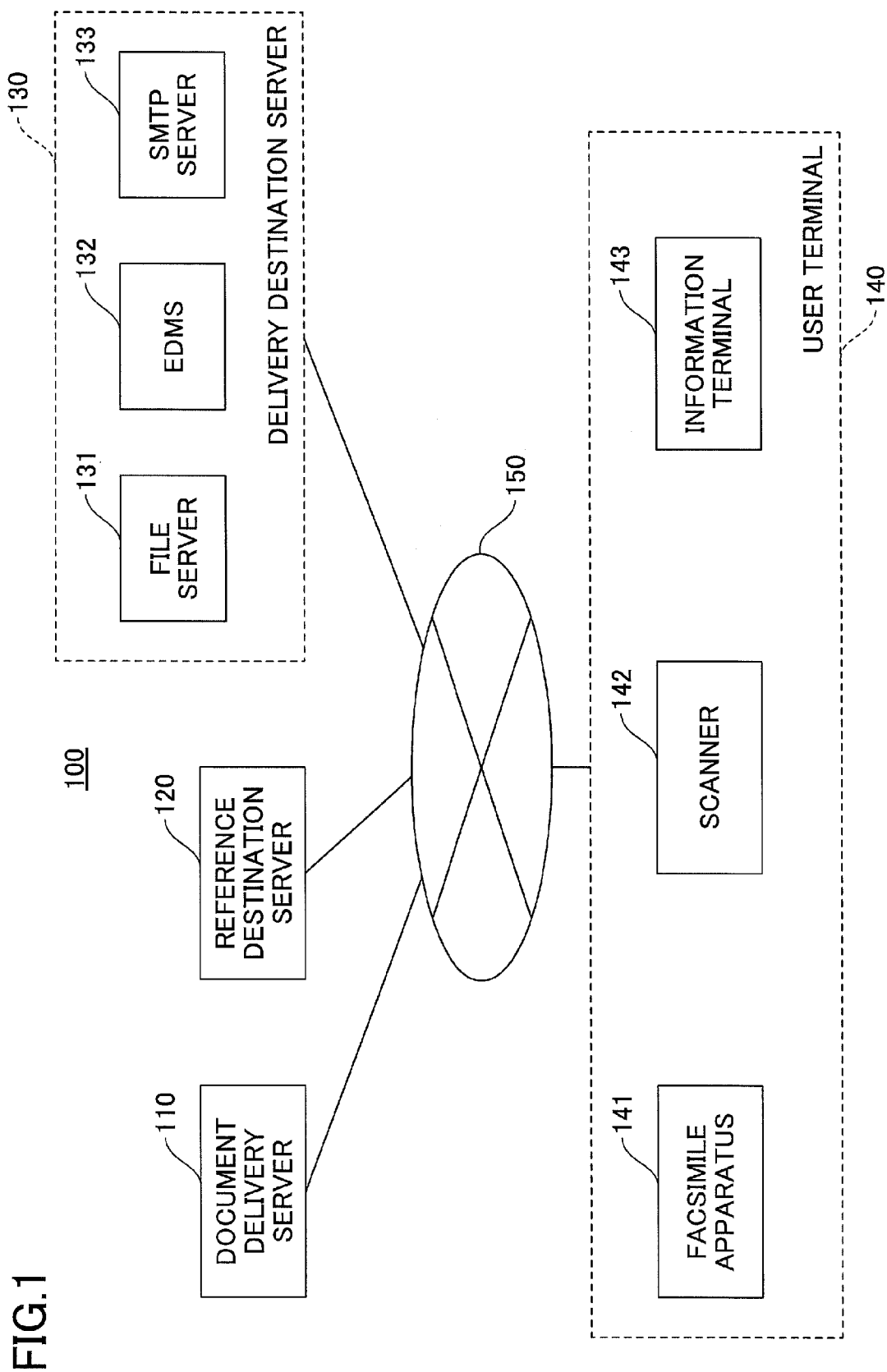
FIG. 1 illustrates an overall configuration of a document delivery system including a document delivery server according to an embodiment of the present invention.

In the following, embodiments of the present invention are described with reference to the accompanying drawings. Note that in the following descriptions and the drawings, elements that have substantially identical functional features are given the same reference numerals and overlapping descriptions thereof are omitted.

[First Embodiment]

<Document Delivery System Configuration>

In the following, an overall configuration of a document delivery system including a document delivery server (information processing apparatus) according to an embodiment of the present invention is described. FIG. 1 illustrates an exemplary configuration a document delivery system 100 according to the present embodiment.

As illustrated in FIG. 1, the document delivery system 100 includes a document delivery server 110, a reference destination server 120, a delivery destination server 130, and a user terminal 140 that are interconnected via a network 150.

The delivery destination server 130 includes a file server 131, an EDMS (Enterprise Document Management System) 132, and an SMTP (Simple Mail Transfer Protocol) server 133. The delivery destination server 130 receives delivery data transmitted by the document delivery server 110 via the network 150.

The user terminal 140 includes a facsimile apparatus 141, a scanner 142, and an information terminal 143. The user terminal 140 generates document data by scanning an original document or by using a predetermined document creation application, and transmits the generated document data to the document delivery server 110 along with a document delivery request. Note that document data is an example of processing data to be processed and delivered according to the present invention.

The document delivery server 110 transmits the document data to the delivery destination server 130 in response to the document delivery request from the user terminal 140.

The reference destination server 120 provides an object to the document delivery server 110. The reference destination server 120 may be, for example, a web server that provides an object to a web browser. In the present embodiment, the reference destination server 120 provides an object corresponding to a URL (Uniform Resource Locator) that is specified by a plugin included in the document delivery server 110.

The delivery destination server 130 is a server at the delivery destination of the document data delivered by the document delivery server 110.

<Document Delivery Process Flow in Document Delivery System>

Figure 2:
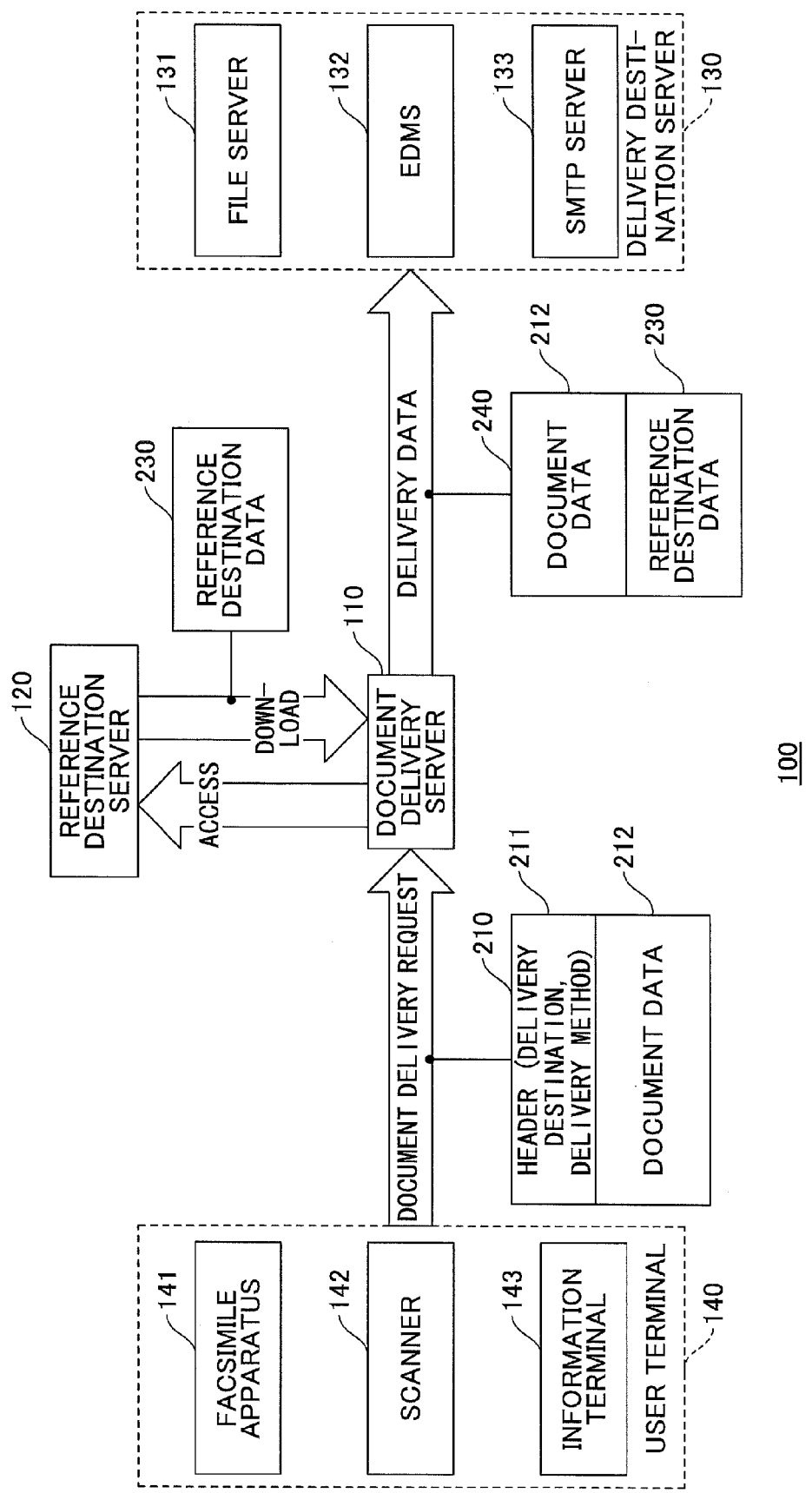
FIG. 2 is a block diagram illustrating a flow of a document delivery process executed by the document delivery system.

In the following, a process flow of a document delivery process in the document delivery system 100 is described. FIG. 2 is a block diagram illustrating an exemplary flow of a document distribution process executed in the document distribution system 100.

As illustrated in FIG. 2, the user terminal 140 generates document data to be delivered. Specifically, the facsimile apparatus 141 and the scanner 142 may generate the document data by scanning an original document. Also, the information terminal 143 may generate the document data using a predetermined document creation application.

In the present embodiment, it is assumed that the document data generated by the user terminal 140 includes a reference destination such as a URL for accessing an object stored in the reference destination server 120.

Then, the user terminal 140 transmits a document delivery request 210 to the document delivery sever 110 to have the generated document data delivered to its delivery destination. The document delivery request 210 from the user terminal 140 includes a header 211 containing relevant information such as information indicating the delivery destination and information specifying the delivery method, and the document data 212 to be delivered.

The document delivery server 110 that receives the document delivery request 210 analyzes the content of the document data 212 and identifies the reference destination included therein. Specifically, in the case where the document data 210 corresponds to document data generated by the facsimile apparatus 141 or the scanner 142, a character recognition process may be performed on the document data, and the reference destination such as a URL may be located thereafter, for example. In the case where the document data 210 corresponds to document data generated by a predetermined document creation application, the reference destination such as a URL may be directly located.

Upon identifying the reference destination such as a URL based on the document data 212, the document delivery server 110 activates a plugin and accesses the reference destination server 120 based on the identified URL. In this way, the document delivery server 110 may acquire an object from the reference destination such as the URL that is identified based on the document data 212. Note that in the following, an object acquired from a reference destination such as a URL is referred to as "reference destination data". Note, also, that reference destination data corresponds to an example of other data acquired from the reference destination specified by specific information according to the present invention.

The document delivery server 110 acquires reference destination data 230 by downloading the reference destination data 230 from the reference destination server 120. The document delivery server 110 then uses the acquired reference destination data 230 to generate delivery data 240 to be transmitted to the delivery destination server 130.

Specifically, the document delivery server 110 generates the delivery data 240 by attaching the reference destination data to the document data 212. Note that in the present embodiment, it is assumed that the document data 212 and the reference destination data 230 are stored in the document delivery server 110.

The delivery data 240 that is generated by the document delivery server 110 is transmitted to the delivery destination server 130. In this way, the document data 212 may be viewed at the delivery destination server 130. Also, the reference destination data may be easily and reliably viewed without having to access the reference destination (situations may be avoided in which desired data cannot be viewed as a result of the reference data being deleted or changed, for example). As a result, usability for the user at the delivery destination may be improved.

<Document Delivery Server Configuration>

Figure 3:
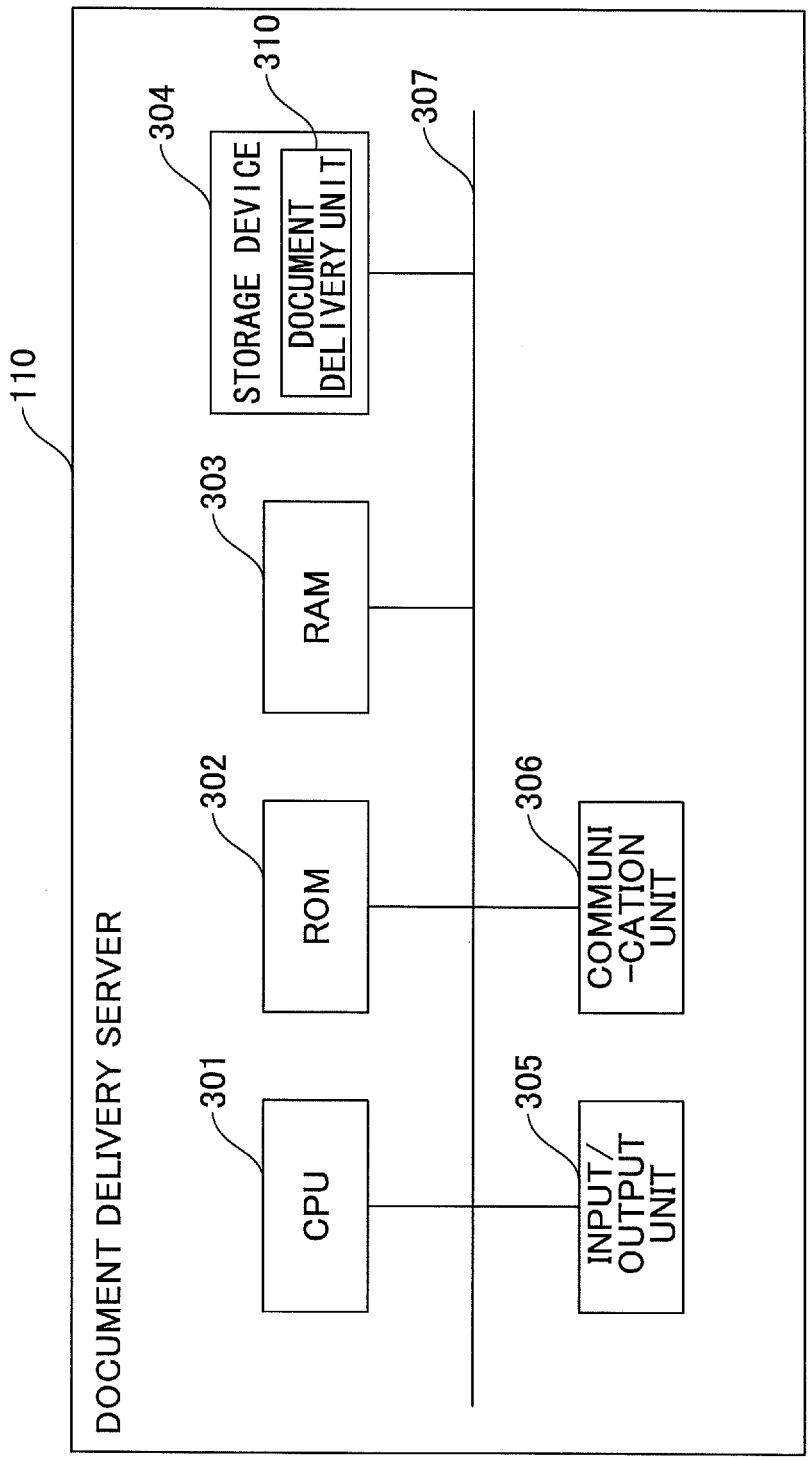
FIG. 3 is a block diagram illustrating a hardware configuration of the document delivery server.

In the following, a configuration of the document distribution server 110 is described. FIG. 3 is a block diagram illustrating an exemplary configuration of the document distribution server 110.

As illustrated in FIG. 3, the document delivery server 110 includes a CPU (Central Processing Unit) 301, a ROM (Read Only Memory) 302, a RAM (Random Access Memory) 303, a storage device 304, an input/output unit 305, and a communication unit 306 that are interconnected via a bus 307.

The CPU 301 is a computer that executes a program stored in the storage device 304 to implement functions of a document delivery unit 310. By having the CPU 301 execute the program for implementing the functions of the document delivery unit 310, the document delivery server 110 executes a document delivery process for transmitting to the delivery destination server 130 document data received along with a delivery request from the user terminal 140 and reference destination data associated with the document data.

The ROM 302 is a non-volatile memory. The ROM 302 stores various programs and data for enabling the CPU 301 to execute the program for implementing the functions of the document delivery unit 310. For example, the ROM 302 may store a booting program such as a BIOS (Basic Input/Output System) or an EFI (Extensible Firmware Interface).

The RAM 303 is a main memory such as a DRAM (Dynamic Random Access Memory) or a SRAM (Static Random Access Memory). The RAM 303 may be used as a working area for the CPU 301 when the CPU 301 loads the program for implementing the functions of the document distribution unit 310 to execute the program.

The storage device 304 stores the program for implementing the functions of the document delivery unit 310. The storage device 304 may also store data for executing the document delivery process and data acquired upon performing the document delivery process, for example.

The input/output unit 305 may input various instructions to the document delivery server 110 and display internal states of the document delivery server 110, for example. The communication unit 306 may receive a document delivery request from the user terminal 140 via the network 150, access the reference destination server 120, receive the reference data 230, and transmit the delivery data 240 to the delivery destination server 130, for example.

<Functional Configuration of Document Delivery Unit>

Figure 4:
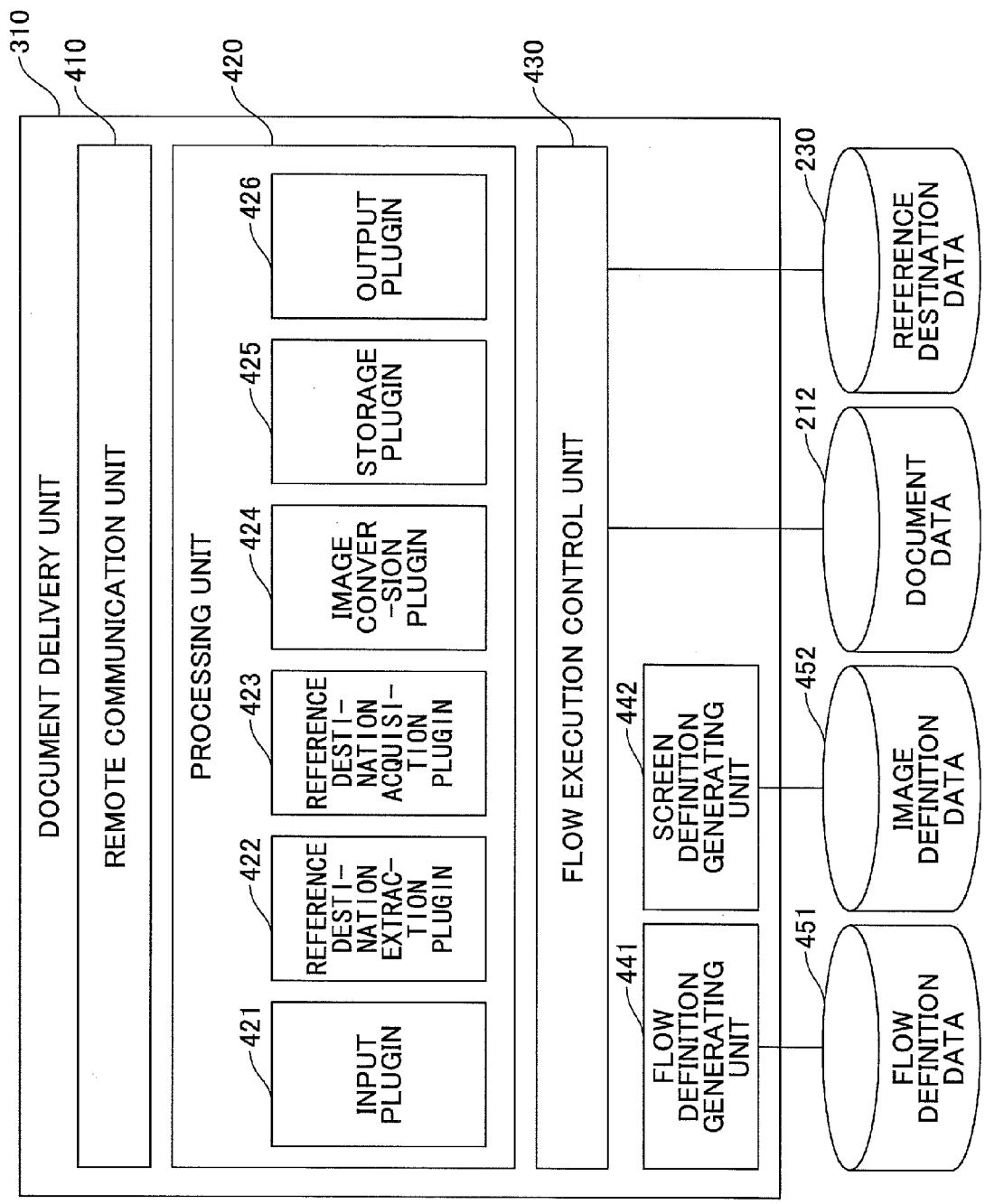
FIG. 4 is a block diagram illustrating a functional configuration of a document delivery unit of the document delivery server.

In the following, the functional configuration of the document distribution unit 310 is described. FIG. 4 is a block diagram illustrating an exemplary functional configuration of the document delivery unit 310. As illustrated in FIG. 4, the document delivery portion 310 includes a remote communication unit 410, a processing unit 420, a flow execution control unit 430, a flow definition generating unit 441, and a screen definition generating unit 442.

Flow definition data 451 defines the flow of various processes to be performed on document data that is generated by the user terminal 140. The flow destination data 451 is transmitted along with the document delivery request 210. Also, screen definition data 452 defines an input screen to be displayed at the user terminal 140, the input screen being displayed for inputting various types of information required for transmitting the document delivery request 210.

The screen definition data 452 and the flow definition data 451 may be stored in predetermined storage areas of the storage device 304.

The remote communication unit 410 may transmit the screen definition data 452 based on a request for the screen definition data 452 from the user terminal 140, or receive the document delivery request 210 from the user terminal 140, for example.

The processing unit 420 has multiple plugins that perform various processes defined by the flow definition data 451.

An input plugin 421 provides the screen definition data 452 to the user terminal 140 via the remote communication unit 410 based on a request from the user terminal 140. The user terminal 140 inputs information such as the delivery destination, the delivery method, and the data name of the document data 212 to be delivered, for example, to the screen definition data 452 provided by the input plugin 421. Then, the user terminal 140 transmits the document data 212 along with the document delivery request 210. In this way, the input plugin 421 may receive the header 211 including information indicating the delivery destination and information identifying the delivery method, and the document data 212 to be delivered.

Figure 5:
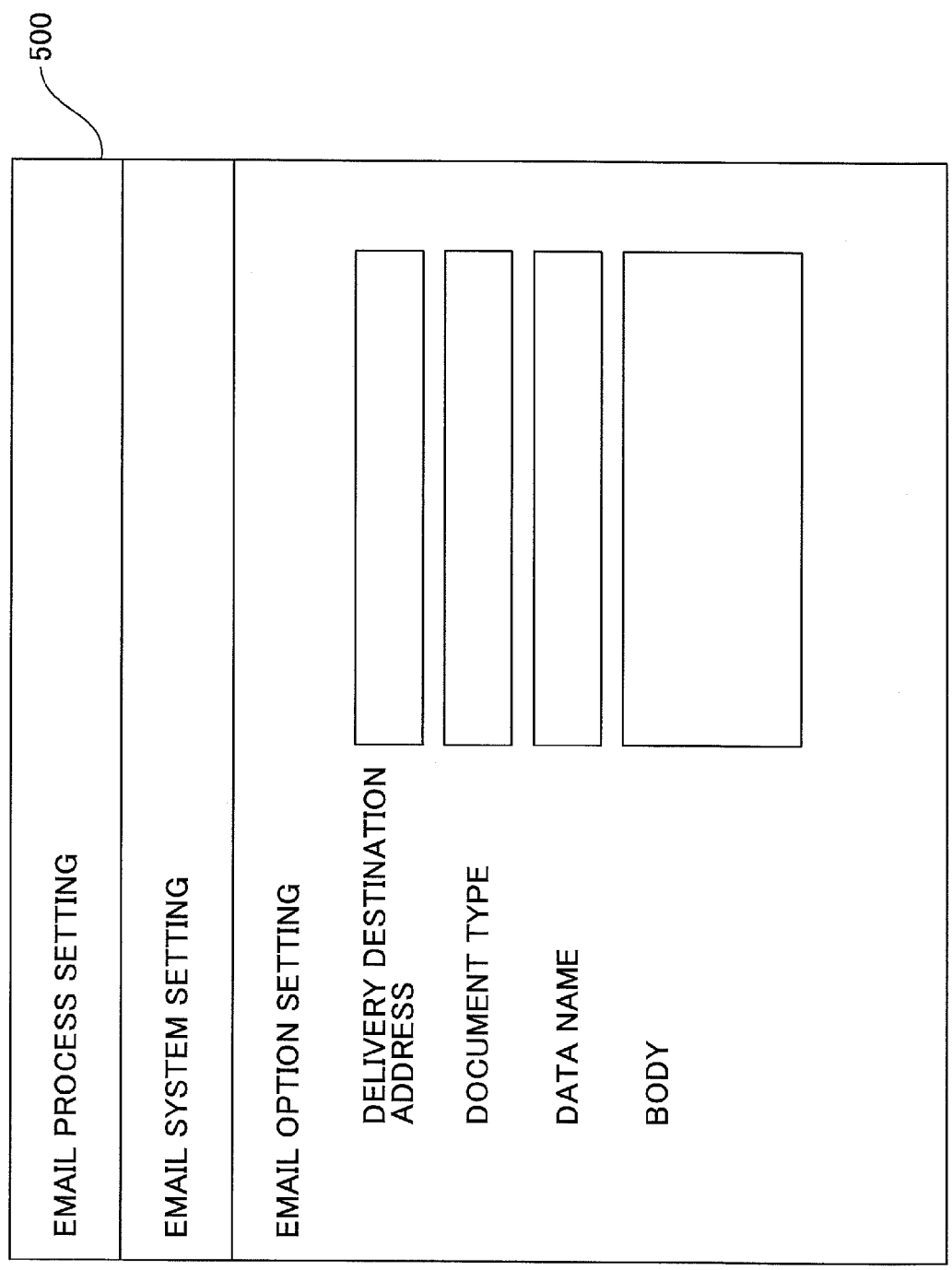
FIG. 5 illustrates an exemplary input screen provided by an input plugin of the document delivery unit.

FIG. 5 illustrates an exemplary input screen 500 displayed at the user terminal 421 based on the screen definition data 452 provided by the input plugin 421. In FIG. 5, email transmission is selected as the delivery method to be used to deliver the document data 212.

As illustrated in FIG. 5, the input screen 500 includes a "delivery destination address" field for inputting a delivery destination address, a "document type" field for entering the type of the document data 212, and a "data name" field for entering the data name of the document data 212. The input screen 500 also includes a field for entering the body (message) of the email.

Referring back to FIG. 4, a reference destination extraction plugin 422 analyzes the document data 212 received by the input plugin 421 and extracts specific information specifying the reference destination. Specifically, in the case where the document data 212 is generated by the scanner 142 or the facsimile apparatus 141, a character recognition process may be performed on the document data 212, and a matching process may be performed thereafter to extract information matching specific information (character string) specifying the reference destination. In the case where the document data 212 is generated by a predetermined document creation application, the matching process may be performed directly on the document data 212 to extract information matching specific information (character string) specifying the reference destination.

Further, if graphic information is included in the document data 212, a graphic recognition process may be performed on the document data 212, and a matching process may be performed thereafter to extract information matching specific information (graphic information) specifying the reference destination. Then, the reference destination is identified based on the character string or graphic information extracted by the matching process.

Figure 6:
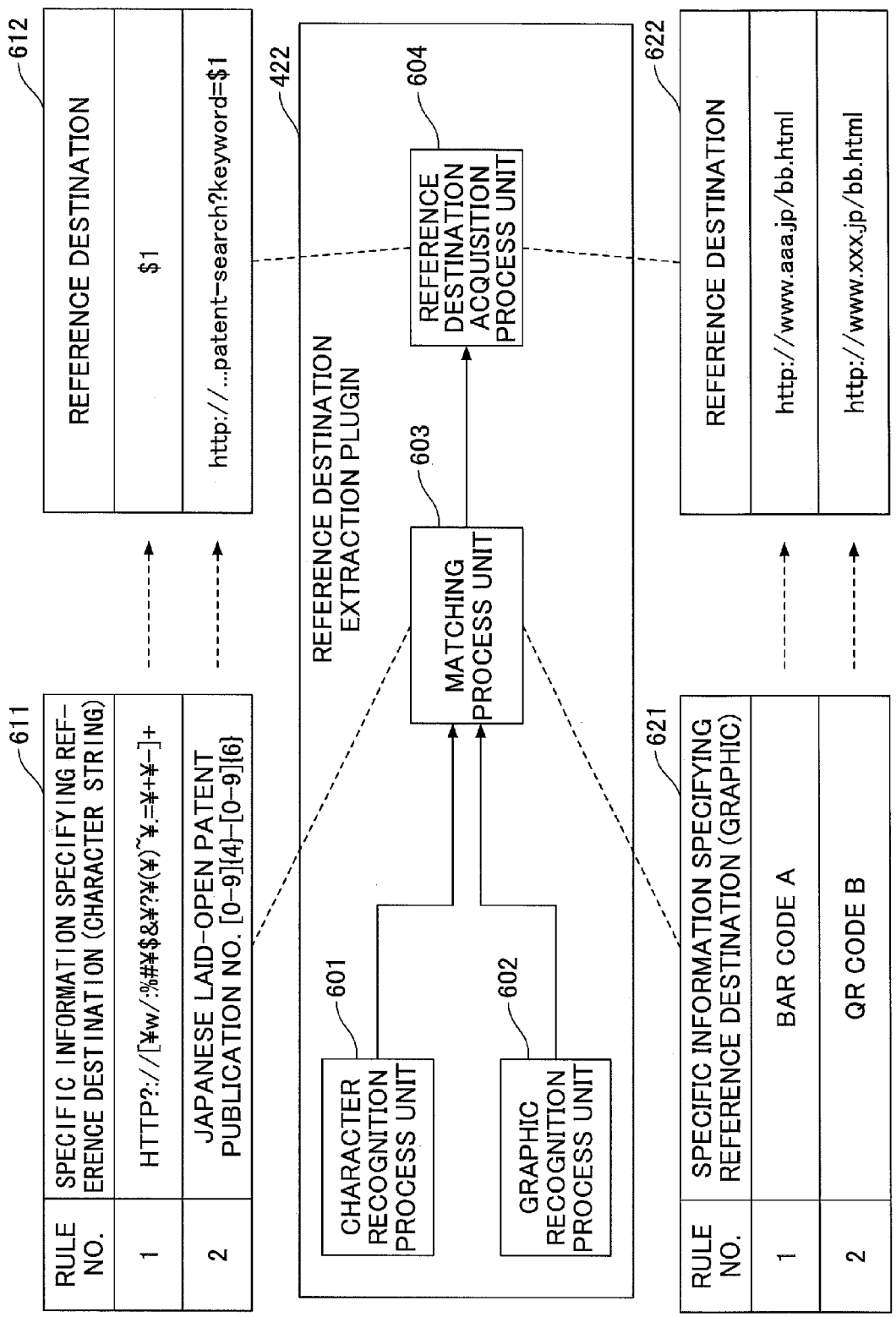
FIG. 6 illustrates a process of a reference destination extraction plugin of the document delivery unit.

FIG. 6 is a block diagram illustrating detailed processes of the reference destination extraction plugin 422. As illustrated in FIG. 6, the reference destination extraction plugin 422 includes a character recognition process unit 601 that performs a character recognition process on the document data 212 included in the document delivery request 210 received from the user terminal 140, for example. Also, the reference destination extraction plugin 422 includes a graphic recognition process unit 602 that performs a graphic recognition process on the document data 212 included in the document delivery request 210.

Further, the reference destination extraction plugin 422 includes a matching process unit 603 that defines specific information (character strings or graphic information) specifying the reference destination (e.g. see tables 611 and 621). The character strings or graphic information are represented according to predetermined rules (see tables 611 and 621), and in this way, a reference destination may be uniquely identified based on specific information included in the document data 212.

For example, specific information according to rule 1 of table 611 indicates that a URL may be directly identified based on a character string described according to this rule (i.e. "$1" in table 612 indicates that the character string may be handled directly as a URL). Thus, according to rule 1, the "specific information specifying the reference destination" and the "reference destination" are the same.

Also, specific information according to rule 2 of table 611 indicates that a character string described according to this rule forms a part of a predetermined URL, and that the predetermined URL may be identified by incorporating the character string described according to rule 2 into a predetermined character string.

Further, graphic information described according to rule 1 of table 621 corresponds to a bar code representing a predetermined URL. The specific information according to rule 1 of table 621 indicates that the predetermined URL may be identified by reading the bar code. Also, graphic information described according to rule 2 of table 621 corresponds to a QR code (registered trademark) representing a predetermined URL. The specific information according to rule 2 of table 621 indicates that the predetermined URL may be identified by reading the QR code.

The matching process unit 603 extracts, from the document data 212 that has undergone the character recognition process and the graphic recognition process, specific information specifying the reference destination expressed in accordance with one or more of the predetermined rules. Then, a reference destination acquisition process unit 604 refers to tables 612 and 622, and identifies the reference destination (e.g. URL) of the document data 212 based on specific information specifying the reference destination (character string or graphic information) that is extracted by the matching process unit 603.

Referring back to FIG. 4, a reference destination acquisition plugin 423 accesses the reference destination that has been identified by the reference destination extraction plugin 422 and acquires the reference destination data 230.

An image conversion plugin 424 generates the delivery data 240 using the document data 212 received by the input plugin 421 and the reference destination data 230 acquired by the reference destination acquisition plugin 423. Specifically, the image conversion plugin 424 generates the delivery data 240 by attaching the reference destination data 230 to the document data 212.

A storage plugin 425 stores the document data 212 received by the input plugin 421 and the reference destination data 230 acquired by the reference destination acquisition plugin 423 in a predetermined memory area of the storage device 304.

An output plugin 426 transmits the delivery data 240 generated by the image conversion plugin 424 to the delivery destination server 130. Note that the output plugin 426 may transmit the delivery data 240 using a predetermined protocol such as the FTP (File Transfer Protocol), the SMB (Server Message Block) protocol, or an email transmission protocol, for example.

<Document Delivery Process in Document Delivery Server>

Figure 7:
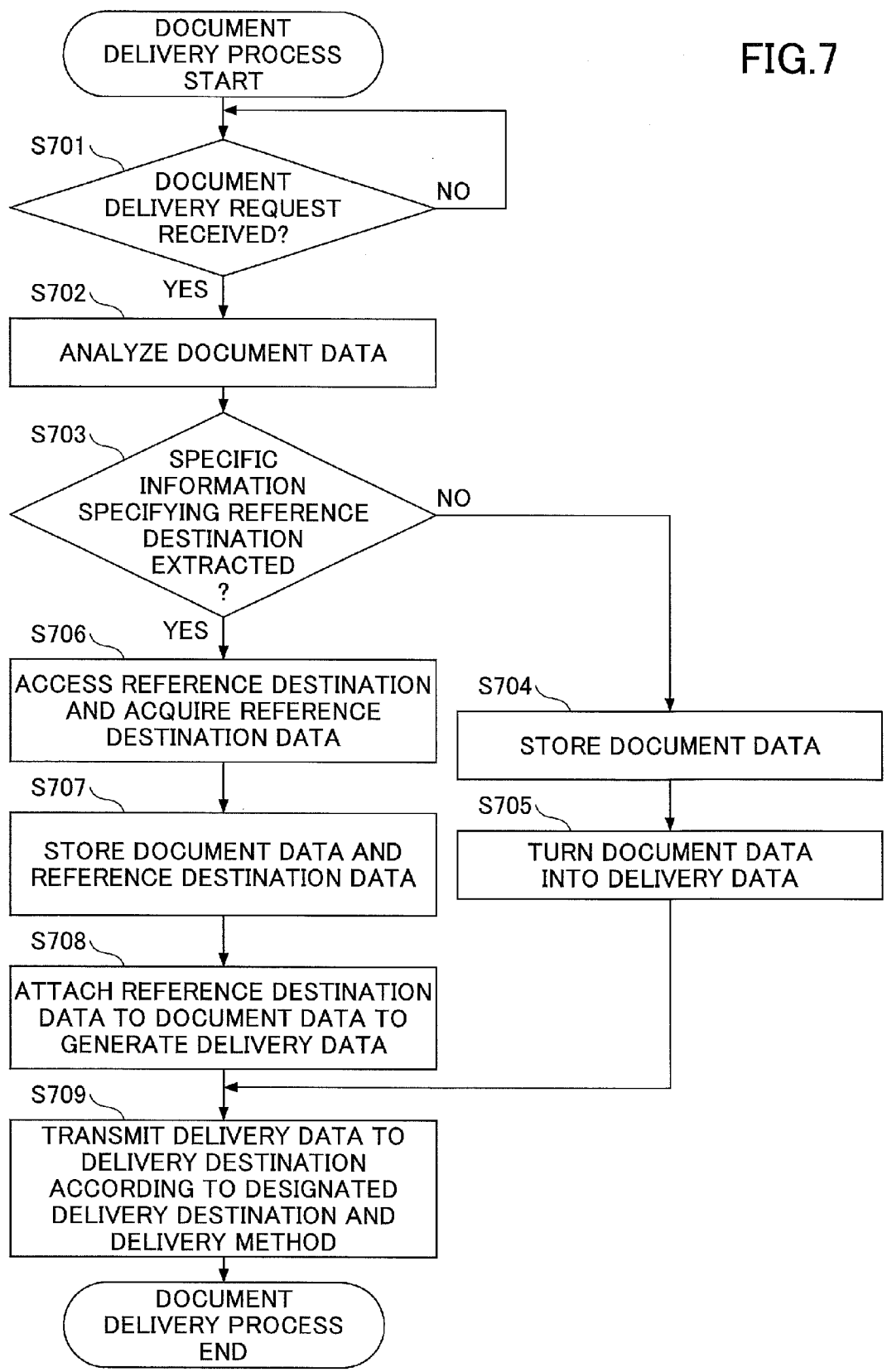
FIG. 7 is a flowchart illustrating an exemplary document delivery process executed by the document delivery server.

In the following, a process flow for executing a document delivery process in the document delivery server 110 according to the present embodiment is described. The process includes generating flow definition data 451 by combining the plugins 421-426 and executing a document delivery process. FIG. 7 is a flowchart illustrating an exemplary process flow of a document delivery process executed by the document delivery server 110 in accordance with the flow definition data 451.

In step S701, the input plugin 421 determines whether it has received the document delivery request 210 from the user terminal 140. If the input plugin 421 determines that the document delivery request 210 has not been received, the input plugin 421 waits until the document delivery request 210 is received.

In step S701, if it is determined that the document delivery request 210 has been received by input plugin 421, the process proceeds to step S702, and the reference destination extraction plugin 422 analyzes the content of the document data 212 included in the received document delivery request 210.

In step S703, a determination is made as to whether specific information specifying the reference destination has been extracted based on the results of the analysis made by the reference destination extraction plugin 422 and the document data 212.

In step S703, if it is determined that specific information specifying the reference destination has not been extracted from the document data 212, the process proceeds to step S704.

In step S704, the storage plugin 425 stores the document data 212 in a predetermined memory area of the storage device 304. Further, in step S705, the image conversion plugin 424 recognizes the document data 212 included in the delivery request 210 as the delivery data 240 to be delivered to the delivery destination server 130 and transmits the delivery data 240 to the output plugin 426.

On the other hand, in step S703, if it is determined that specific information specifying the reference destination is extracted from the document data 212, the process proceeds to step S706. In step S706, the reference destination acquisition plugin 423 accesses the reference destination and acquires the reference destination data 230.

Further, in step S707, the storage plugin 425 stores the document data 212 included in the document data 212 and the reference destination data 230 acquired by the reference destination acquisition plugin 423 in a predetermined memory area of the storage device 304.

In step S708, the image conversion plugin 424 generates the delivery data 240 by attaching the reference destination data 230 to the document data 212 and transmits the generated delivery data 240 to the output plugin 426.

In step S709, the output plugin 426 transmits the delivery data 240 to the delivery destination server 130 according to the delivery method and the delivery destination specified in the document delivery request 210.

<Example of Delivery Data>

In the following, an example of the delivery data 240 generated by a document delivery process executed by the document delivery server 110 in response to the document delivery request 210 is described.

Figure 8:
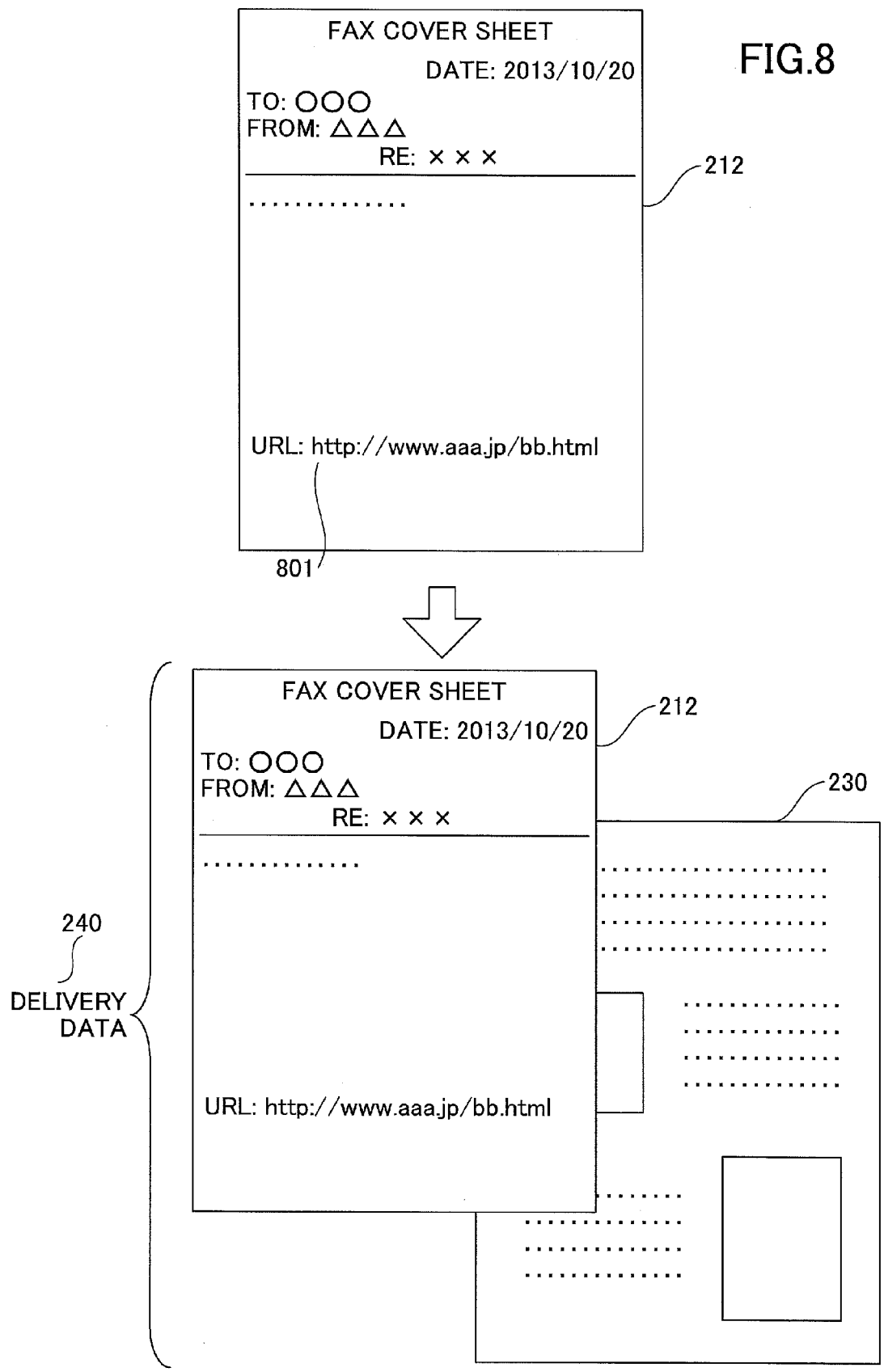
FIG. 8 illustrates an exemplary manner in which the document delivery server generates delivery data.

FIG. 8 illustrates an example of the delivery data 240 generated by a document delivery process executed by the document delivery server 110 in response to the document delivery request 210. In FIG. 8, the document data 212 includes a URL 801 corresponding to a reference destination. Thus, the document delivery server 110 accesses the reference destination server 120 based on the URL 801 to acquire the reference destination data 230. Then, the document delivery server 110 attaches the reference destination data 230 to the document data 212 to generate the delivery data 240.

<Summary>

As can be appreciated from the above, a document delivery server according to the present embodiment is configured to:

Analyze the content of document data included in a document delivery request, and extract specific information specifying a reference destination from the document data;

Access the specified reference destination based on the extracted specific information to acquire reference destination data;

Generate delivery data by attaching the reference destination data acquired from the reference destination server to the document data included in the document delivery request; and Transmit the generated delivery data to the delivery destination server according to the delivery method and the delivery destination specified in the document delivery request.

According to an aspect of the present embodiment, a situation in which a user at the delivery destination server 130 is unable to view desired data may be avoided (i.e. the desired data may be reliably viewed by the user at the destination server 130). As a result, usability for the user at the delivery destination may be improved, for example.

[Second Embodiment]

In the first embodiment, the delivery data 240 is generated by attaching the reference data acquired from the reference destination server 120 to the document data included in the document delivery request 210, and the generated delivery data 240 is transmitted to the delivery destination server 130. However, the present invention is not limited to the above.

For example, in a second embodiment of the present invention, the document data included in the document delivery request and the reference destination data acquired from the reference destination server may be converted into a predetermined format such as the PDF format (preferably a format enabling data to be reproduced regardless of the environment of the delivery destination), and the converted data may be transmitted to the delivery destination. By converting the data to PDF format, for example, a user at the delivery destination may be able to reliably view the document data and the reference destination data. Note that the following descriptions are mainly focused on features of the present embodiment that differ from those of the first embodiment.

<Document Delivery Process in Document Delivery Server>

Figure 9:
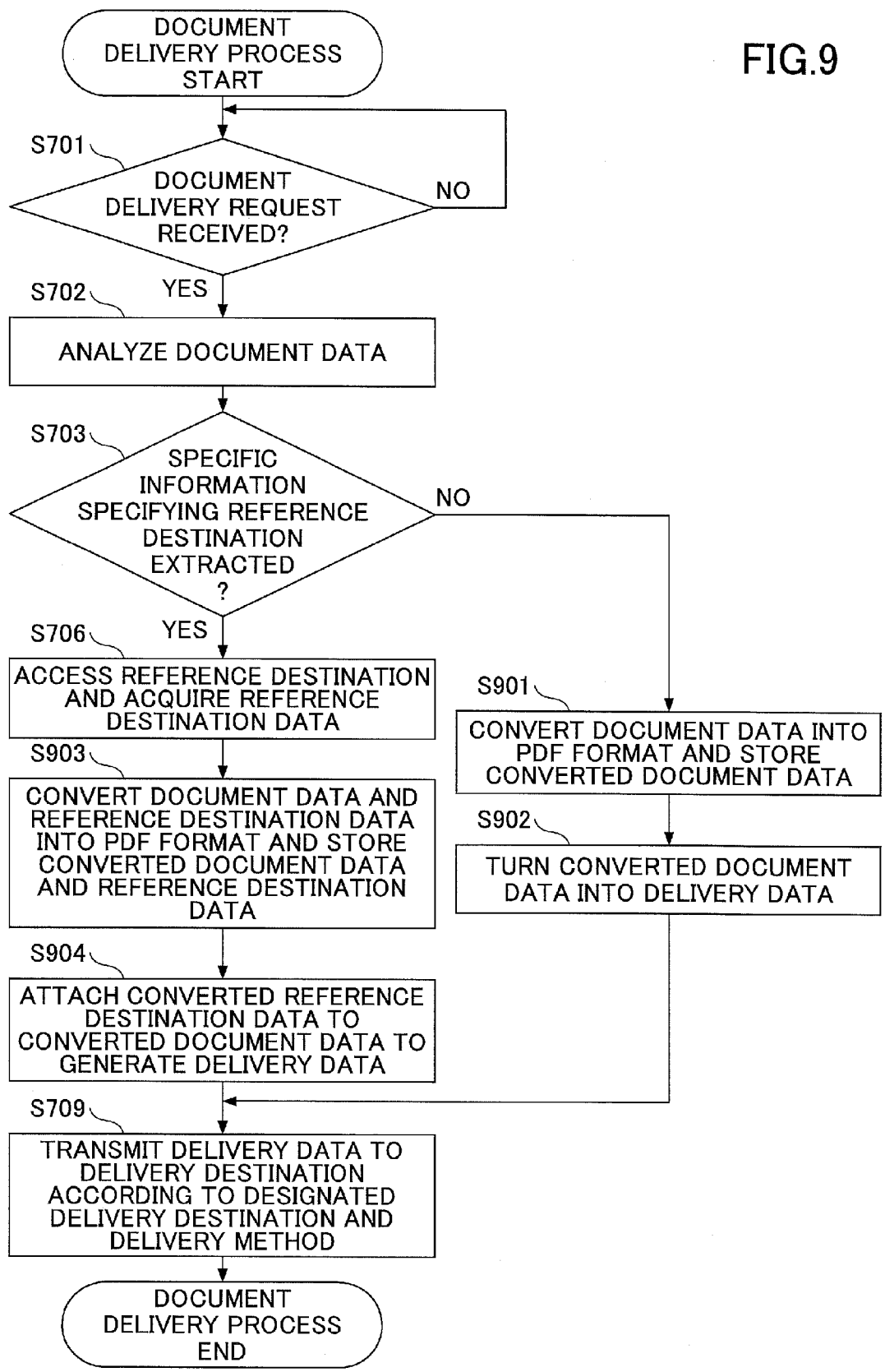
FIG. 9 is a flowchart illustrating another exemplary document delivery process executed by the document delivery server.

In the following, a process flow of a document delivery process executed in the document distribution server 110 according to the present embodiment is described. FIG. 9 is a flowchart illustrating an exemplary flow of the document delivery process executed in the document delivery server 110 according to the present embodiment. Note that steps S701-S703 of FIG. 9 are substantially identical to steps S701-S703 of FIG. 7 described above in connection with the first embodiment. Accordingly, descriptions of these steps are omitted below.

In step S703, if it is determined that specific information specifying the reference destination has not been extracted, the process proceeds to step S901 where the image conversion plugin 424 converts the document data 212 included in the document delivery request 212 into PDF format. Then, the storage plugin 425 stores the converted document data in the storage device 304.

In step S902, the image conversion plugin 424 recognizes the converted document data as the delivery data 240 to be delivered to the delivery destination and transmits the delivery data 240 to the output plugin 426.

On the other hand, in step S703, if it is determined that specific information specifying the reference destination is not extracted from the document data 212, the process proceeds to step S706. In step S706, the reference destination acquisition plugin 423 accesses the reference destination to acquire the reference destination data 230.

Further, in step S903, the image conversion plugin 424 converts the document data 212 included in the document delivery request 210 and the acquired reference destination data 230 into PDF format. Also, the storage plugin 425 stores the converted document data and reference destination data in a predetermined memory area of the storage device 304.

Note that when converting the data into PDF format in step S903, the image conversion plugin 424 may be configured to add a link function to the specific information specifying the reference destination that is extracted from the analysis conducted in step S702. In this way, a user at the reference destination server 130 may be able to view the reference destination data as attachment data, and also actually access the reference server 120 by performing a predetermined operation on the character string or graphic information specifying the reference destination, for example.

In step S904, the image conversion plugin 424 generates the delivery data 240 by attaching the converted reference destination data to the converted document data and transmits the generated delivery data 240 to the output plugin 426.

In step S709, the output plugin 426 transmits the delivery data 240 received from the image conversion plugin 424 to the delivery destination server 130 according to the delivery method and the delivery destination included in the document delivery request 210.

<Example of Delivery Data>

In the following, an example of the delivery data 240 generated by a document delivery process executed by the document delivery server 110 in response to the document delivery request 210 according to the present embodiment is described.

Figure 10:
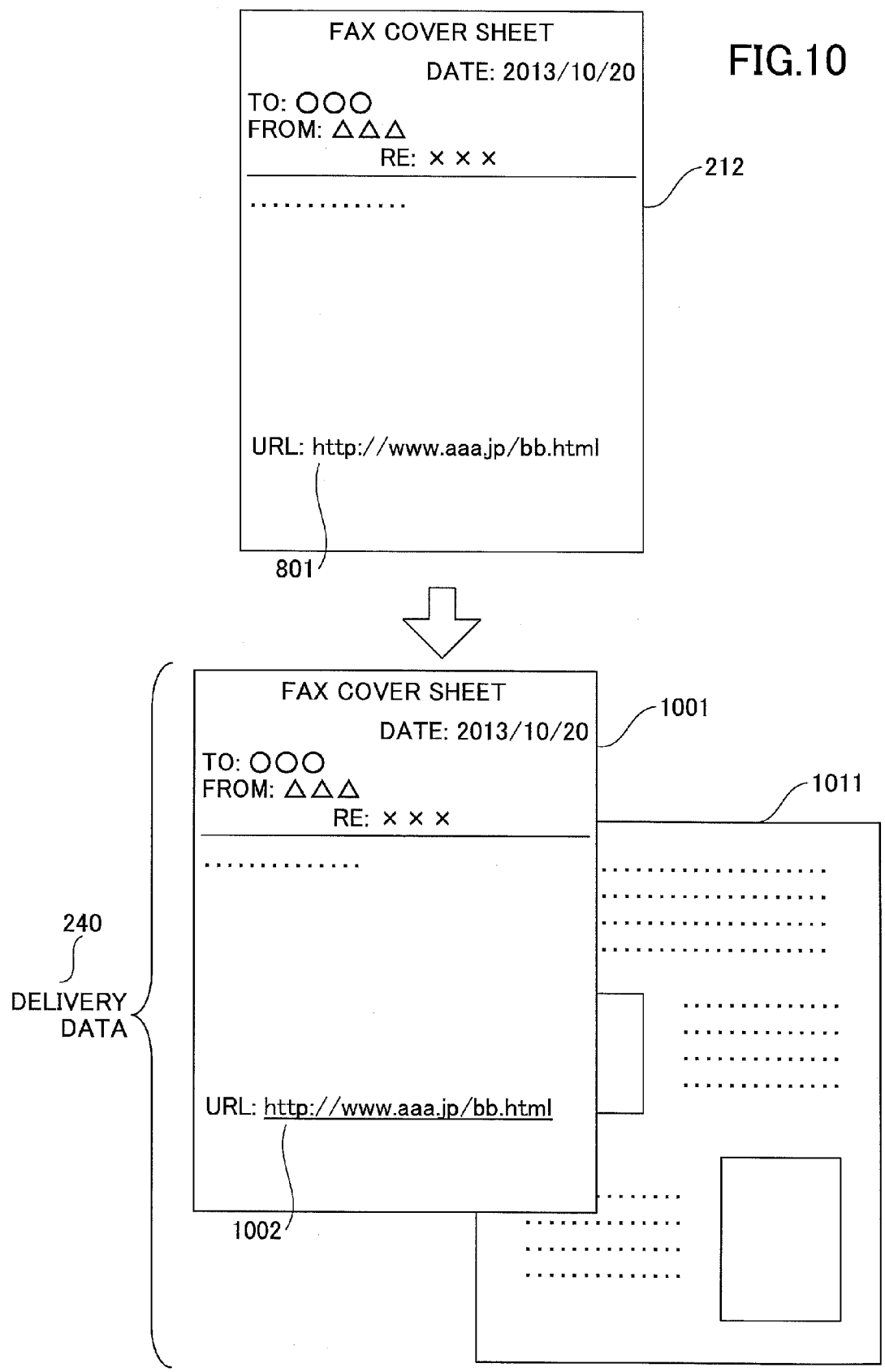
FIG. 10 illustrates another exemplary manner in which the document delivery server generates delivery data.

FIG. 10 is a diagram illustrating an exemplary manner in which the delivery data 240 is generated by a document delivery process executed by the document delivery server 110 in response to the document delivery request 210 according to the present embodiment. In FIG. 10, the document data 212 includes the URL 801 corresponding to the reference destination. Thus, the document delivery server 110 accesses the reference destination server 120 based on the URL 801 to acquire the reference destination data.

In the present embodiment, the document delivery server 110 converts the acquired reference destination data 230 into PDF format to generate reference destination data 1011.

Also, the document delivery server 110 converts the document data 212 included in the document delivery request 210 into PDF format to generate document data 1001. Note that in converting the document data 212 into PDF format, the document delivery server 110 adds a link function to the URL 801 to generate a URL 1002.

Then, the document delivery server 110 generates the delivery data 240 by attaching the reference destination data 1011 to the document data 1001 including the URL 1002 with the link function.

As can be appreciated from the above, according to an aspect of the present embodiment, document data included in a document delivery request and reference destination data acquired from a reference destination server are each converted into a predetermined format such as the PDF format, and the converted data are transmitted to the delivery destination.

In this way, a user at the delivery destination server 130 may be able to reliably view the document data and the reference destination data, for example.

Also, according to an aspect of the present embodiment, in converting the document data into PDF format, the document delivery server 110 is configured to add a link function to the specific information specifying the reference destination.

In this way, the user of the delivery destination server 130 may be able to view the reference destination data as attachment data, and also actually access the referenced server 120.

As a result, usability for the user at the delivery destination may be further improved, for example.

[Third Embodiment]

In the second embodiment, the delivery data 240 is generated by converting the reference destination data and the document data into PDF format and attaching the converted reference destination to the converted document data. However, the present invention is not limited such an embodiment. For example, according to a third embodiment of the present invention, the document data 1001 converted into PDF format and the reference destination data 1011 converted into PDF format may be connected to form a single set of data.

Figure 11:
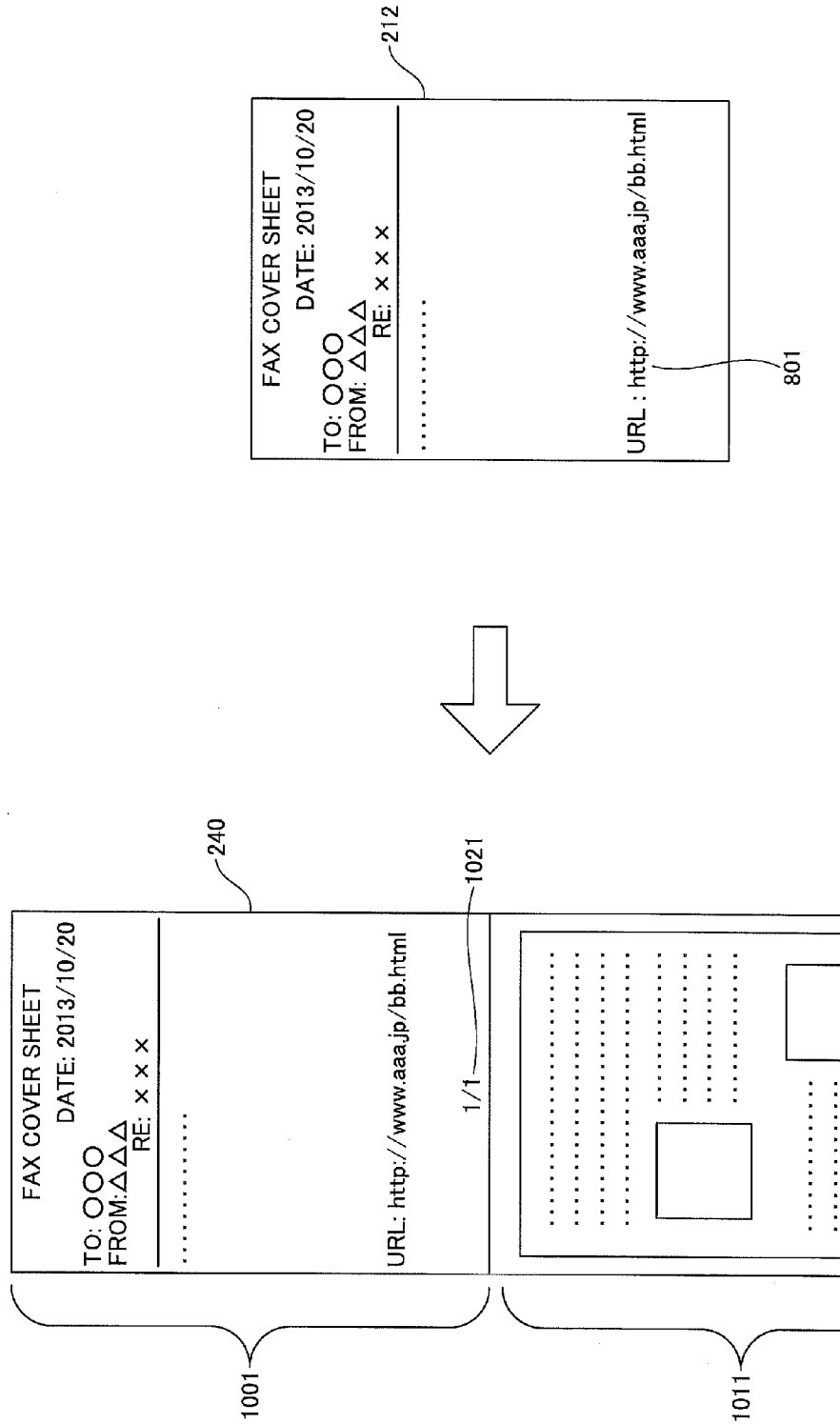
FIG. 11 illustrates another exemplary manner in which the document delivery server generates delivery data.

FIG. 11 illustrates an exemplary manner of generating the delivery data 240 by a document delivery process executed by the document delivery server 110 in response to the document delivery request 210 according to the present embodiment. In FIG. 11, the document data 212 includes the URL 801 corresponding to the reference destination. Thus, the document delivery server 110 accesses the reference destination server 120 based on the URL 801 to acquire the reference destination data 230, and converts the acquired reference destination data 230 into PDF format to generate the reference destination data 1011. Also, the document delivery server 110 converts the document data 212 into PDF format to generate the document data 1001. Then, the document delivery server 110 connects the reference destination data 1011 to the document data 1001 to generate a single set of data as the delivery data 240.

Note that in connecting the reference destination data 1011 to the document data 1001, a character string indicating that the reference destination data 1011 corresponds to data associated with the document data 1001 may be added in order to distinguish the reference destination data 1011 from the document data 1001, for example. In the example of FIG. 11, a page number 1021 is added to the document data 1001, and a character string 1022 is added to the reference destination data 1011 to indicate that the data corresponds to attachment data associated with the document data 1001. By altering the display modes of the document data 1001 and the reference destination data 1011 in the manner described above, for example, the user at the reference destination may be able to easily recognize the distinction between the document data 1001 and the reference destination data 1011 associated with the document data 1001.

As can be appreciated from the above, according to an aspect of the present embodiment, a user at the delivery destination may be able to view document data and linked data as a single set of data. As a result, usability for the user at the delivery destination may be further improved, for example.

[Fourth Embodiment]

In the second embodiment, the reference destination data 230 acquired from the reference destination is converted into PDF format and attached to the document data 210 converted into PDF format. However, the present invention is not limited to such an embodiment. Note that because the reference destination data 1011 converted in to the PDF format is stored in the storage device 304 of the document delivery server 110, the reference destination data 1011 may be acquired by accessing the document delivery server 110 instead of accessing the reference destination server 120. Accordingly, in a fourth embodiment of the present invention, specific information specifying the storage destination of the reference destination data 1011 in the storage device 304 of the document delivery server 110 is added to the reference destination data 1011.

FIG. 12 illustrates an exemplary manner of generating the delivery data 240 by a document delivery process executed by the document delivery server 110 in response to the document delivery request 210 according to the present embodiment. In FIG. 12, the document data 212 includes the URL 801 corresponding to the reference destination. Thus, the document delivery server 110 accesses the reference destination server 120 based on the URL 801 to acquire the reference destination data 230 and converts the acquired reference destination data 230 into PDF format to generate the reference destination data 1011.

Also, the document delivery server 110 converts the document data 212 into PDF format, and attaches to the URL 801 specific information 1202 specifying the storage destination of the reference destination data 1011 within the storage device 304 of the document delivery server 110 to generate document data 1201.

Further, the document delivery server 110 generates the delivery data 240 by attaching the reference destination data 1011 converted into PDF format to the document data 1201 converted into PDF format and including the specific information 1202 specifying the storage destination of the reference destination data 1011.

Note that when adding the specific information 1202, a link function may be additionally added to the specific information 1202 specifying the storage destination of the reference destination data 1011, for example. Also, a link function may be added to the URL 801, for example.

As can be appreciated from the above, according to an aspect of the present embodiment, a user at the delivery destination may be able to view the reference destination data as attachment data and also view the reference destination data by accessing the document delivery server 110. As a result, usability for the user at the delivery destination may be further improved, for example.

Note that in the case where the specific information 1202 specifying the storage destination of the reference destination data 1011 is added, the reference destination data may be reliably viewed by accessing the document delivery server 110. Accordingly, in some embodiments, the reference destination data 1011 does not have to be attached to the document data 1201.

[Fifth Embodiment]

In the second embodiment, the reference destination data 230 acquired from the reference destination is converted into PDF format, and the converted reference destination data 1011 is attached to the document data 1001. However, the present invention is not limited to such an embodiment. For example, in a fifth embodiment of the present embodiment, the document delivery server 110 may be configured to add to the document data a description explicitly indicating that the reference destination data is attached to the document data.

FIG. 13 illustrates an exemplary manner of generating the delivery data 240 by a document delivery process executed by the document delivery server 110 in response to the document delivery request 210 according to the present embodiment. In FIG. 13, the document data 212 includes the URL 801 corresponding to the reference destination. Thus, the document delivery server 110 may access the reference destination server 120 based on the URL 801 to acquire the reference destination data 230 and convert the acquired reference destination data 230 into PDF format to generate the reference destination data 1011.

Then, the document delivery server 110 converts the document data 212 into PDF format and generates document data 1301 by adding a character string 1302 below the URL 801 explicitly indicating that the reference destination data 1011 is attached. Further, the document delivery server 110 generates the delivery data 240 by attaching the reference destination data 1011 to the document data 1301.

As can be appreciated from the above, according to an aspect of the present embodiment, a user at the delivery destination may reliably recognize that the reference destination data 1011 is attached upon receiving the delivery data 240.

Note that although the character string 1302 is added to the document data 1301 in the example described above, the present invention is not limited to the above example. For example, in the case of delivering the document data by email transmission, the document delivery server 110 may be configured to add the string to the body of the email.

[Other Embodiments]

In the first embodiment, a web server is described as an example of the reference destination server 120. However, the present invention is not limited to the above example, and the reference destination server 120 may be any system storing reference destination data in a manner such that the reference destination data may be accessed from the outside.

Also, in the first embodiment, the document data 212 and the reference destination data 230 are stored in the storage device 304 of the document delivery server 110. However, the present invention is not limited to such an example. In other embodiments, the document data 212 and the reference destination data 230 may be stored in other servers (e.g. a document management server for managing documents).

Also, in the second to fifth embodiments described above, the delivery data 240 is generated by adding an additional feature such as a character string to document data that is converted into PDF format. However, the present invention is not limited to the above. In other embodiments, the additional feature such as a character string may be added to the document data before the document data is converted into PDF format. Alternatively, the additional feature such as a character string may be added to the delivery data 240 after generating the delivery data 240 that is converted into PDF format, for example.

That is, the order of the process steps of the document delivery process executed by the document delivery server 110 may vary depending on the manner in which the flow definition data 451 is generated. Thus, the data to which the additional feature such as a character string is to be added may vary depending on the flow definition data 451.

Also, although the additional feature such as a character string is added to the document data in the second to fifth embodiments described above, the present invention is not limited thereto. In other embodiments, the document delivery server 110 may be configured to modify a part of a character string contained in the document data, for example. That is, the document delivery server 110 may be configured to edit the document data to include the character string to be added, for example.

Also, although the plugins of the processing unit 420 are stored in the storage device 304 of the document delivery server 110 in the first through fifth embodiments described above, the present invention is not limited thereto. In other embodiments, the plugins may be stored in the user terminal 140 such as the facsimile apparatus 141, and the document delivery process may be executed at the user terminal 140. Alternatively, for example, the plugins of the processing unit 420 may be stored in a plurality of devices that are interconnected by a network, and the devices may be configured cooperate with each other to form an information processing system for executing a document delivery process according to an embodiment of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

Although the present invention has been described above with reference to certain preferred embodiments, the present invention is not limited to these embodiments, and numerous variations and modifications may be made without departing from the scope of the present invention.

The present application is based on and claims the benefit of priority of Japanese Patent Application No. 2013-234031 filed on Nov. 12, 2013, the entire contents of which are hereby incorporated by reference.

What is claimed is:

1. An information processing apparatus comprising:
a memory; and
a processor that implements processes of:
extracting specific information specifying a reference destination of other data from a content of processing data in a case where the specific information specifying the reference destination of the other data is present in the content of the processing data;
converting the content of the processing data into a predetermined application-independent file format;
acquiring the other data from the reference destination specified by the specific information included in the processing data;
adding link information, functioning as a link, to the content of the processing data;
generating delivery data in response to an input of the processing data, the generated delivery data being configured to include the content of the processing data, and such that the acquired other data is viewable based on the generated delivery data; and
adding the link information to content of the specific information in the delivery data linking to the acquired other data, wherein the link information to the content of the specific information does not link to the reference destination, and
wherein the delivery data is generated based on the application-independent file format of the processing data, and the other data that is converted into the same application-independent file format as that of the processing data.

2. The information processing apparatus as claimed in claim 1, wherein the predetermined application-independent file format is PDF.

3. The information processing apparatus as claimed in claim 2, wherein the delivery data is generated by attaching the other data to the processing data, or by connecting the other data to the processing data to form one set of data.

4. The information processing apparatus as claimed in claim 3, wherein the delivery data is generated by including a character string indicating that the other data is attached or connected to the processing data.

5. The information processing apparatus as claimed in claim 1, wherein when the acquired other data is stored in a storage destination, the processor further implements a process of:
editing the processing data such that the delivery data includes specific information specifying the storage destination of the other data.

6. The information processing apparatus as claimed in claim 1, wherein the processing data is obtained by scanning an original document.

7. An information processing system including:
at least one information processing apparatus, the at least one information processing apparatus including:

a memory; and a processor that implements processes of:

receiving a delivery request for processing data;

extracting specific information specifying a reference destination of other data from a content of the processing data in a case where the specific information specifying the reference destination of the other data is present in the content of the processing data;

converting the content of the processing data into a predetermined application-independent file format;

acquiring the other data from the reference destination specified by the specific information included in the processing data;

adding link information, functioning as a link, to the content of the processing data;

generating delivery data in response to the delivery request, the generated delivery data being configured to include the content of the processing data, and such that the acquired other data is viewable based on the generated delivery data; and adding the link information to content of the specific information in the delivery data linking to the other data having been acquired by the acquisition unit, wherein the link information to the content of the specific information does not link to the reference destination; and transmitting the generated delivery data to a delivery destination designated by the delivery request wherein the delivery data is generated based on the application-independent file format of the processing data, and the other data that is converted into the same application-independent file format as that of the processing data.

8. The information processing system as claimed in claim 7, wherein the predetermined application-independent file format is portable document format.

9. The information processing system as claimed in claim 8, wherein the delivery data is generated by attaching the other data to the processing data, or connecting the other data to the processing data to form one set of data.

10. The information processing system as claimed in claim 9, wherein the delivery data is generated by including a character string indicating that the other data is attached or connected to the processing data.

11. The information processing system as claimed in claim 7, wherein when the acquired other data is stored in a storage destination, the processor further implements a process of:

editing the processing data such that the delivery data includes specific information specifying the storage destination of the other data.

12. The information processing apparatus as claimed in claim 7, wherein the processing data is obtained by scanning an original document.

13. A non-transitory computer-readable medium having a program stored thereon that is executable by a computer, wherein execution of the program causes a processor of the computer to implement functions of:

extracting specific information specifying a reference destination of other data from a content of processing data in a case where the specific information specifying the reference destination of the other data is present in the content of the processing data;

converting the content of the processing data into a predetermined application-independent file format;

acquiring the other data from the reference destination specified by the specific information included in the processing data;

adding link information, functioning as a link, to the content of the processing data;

generating delivery data in response to an input of the processing data, the generated delivery data being configured to include the content of the processing data and such that the acquired other data is viewable based on the generated delivery data; and adding the link information to content of the specific information in the delivery data linking to the acquired other data, wherein the link information to the content of the specific information does not link to the reference destination, and wherein the delivery data is generated based on the application-independent file format of the processing data, and the other data that is converted into the same application-independent file format as that of the processing data.

14. The non-transitory computer-readable medium as claimed in claim 13, wherein the predetermined application-independent file format is PDF.

15. The non-transitory computer-readable medium as claimed in claim 14, wherein the delivery data is generated by attaching the other data to the processing data, or connecting the other data to the processing data to form one set of data.

16. The non-transitory computer-readable medium as claimed in claim 15, wherein the delivery data is generated by including a character string indicating that the other data is attached or connected to the processing data.

17. The non-transitory computer-readable medium as claimed in claim 13, wherein when the acquired other data is stored in a storage destination, the processor further implements a process of:

editing the processing data such that the delivery data includes specific information specifying the storage destination of the other data.

18. The information processing apparatus as claimed in claim 13, wherein the processing data is obtained by scanning an original document.

\* \* \* \* \*